(12) United States Patent
Yasui et al.

(10) Patent No.: US 7,743,874 B2
(45) Date of Patent: Jun. 29, 2010

(54) STEERING CONTROL APPARATUS FOR A VEHICLE

(75) Inventors: Yoshiyuki Yasui, Nagoya (JP); Hiroyuki Kodama, Kariya (JP); Kenji Asano, Toyota (JP); Toshihisa Kato, Handa (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 47 days.

(21) Appl. No.: 11/760,082

(22) Filed: Jun. 8, 2007

(65) Prior Publication Data

US 2007/0294008 A1    Dec. 20, 2007

(30) Foreign Application Priority Data

Jun. 15, 2006   (JP) .............................. 2006-165663

(51) Int. Cl.
*B62D 5/04*   (2006.01)
(52) U.S. Cl. .......................... 180/444; 180/446; 701/41
(58) Field of Classification Search ................ 180/443, 180/444, 446; 701/41
See application file for complete search history.

(56) References Cited

U.S. PATENT DOCUMENTS

| | | | | |
|---|---|---|---|---|
| 4,509,611 | A | * | 4/1985 | Kade et al. ................... 180/446 |
| 6,032,755 | A | * | 3/2000 | Blandino et al. ............. 180/446 |
| 6,154,696 | A | | 11/2000 | Nishi et al. |
| 6,597,136 | B2 | * | 7/2003 | Burton et al. ................ 318/432 |
| 6,909,958 | B2 | * | 6/2005 | Post et al. ...................... 701/84 |
| 7,406,374 | B2 | * | 7/2008 | Ono et al. ...................... 701/41 |
| 2006/0041355 | A1 | * | 2/2006 | Blundell et al. ............... 701/41 |

FOREIGN PATENT DOCUMENTS

| | | |
|---|---|---|
| JP | 5-77653 A | 3/1993 |
| JP | 11-129927 A | 5/1999 |
| JP | 2005-170116 A | 6/2005 |

* cited by examiner

*Primary Examiner*—Lesley Morris
*Assistant Examiner*—Marc A Scharich
(74) *Attorney, Agent, or Firm*—Buchanan Ingersoll & Rooney PC

(57) ABSTRACT

A steering control apparatus is provided for a vehicle having a steering wheel for steering steered wheels of the vehicle, a power source for generating power, and drive shafts for transferring the power to the steered wheels, to be served as driving wheels of the vehicle. The apparatus comprises an accelerating operation detection device for detecting accelerating operation amount by a vehicle driver, and a steering torque control device for controlling steering torque created by the steering wheel, and applying torque steer reducing torque to the steering wheel. The steering torque control device is adapted to reduce torque steer, which is transiently created on the steering wheel due to characteristics of the drive shafts, when the accelerating operation amount detected by the accelerating operation detection device becomes equal to or greater than a predetermined value.

8 Claims, 13 Drawing Sheets

(A) INCREASING GRADIENT (KTup) OF TORQUE STEER REDUCING TORQUE (B) MAXIMUM VALUE (Ttsm) OF TORQUE STEER REDUCING TORQUE (C) HOLDING TIME (Thld) OF MAXIMUM TORQUE STEER REDUCING TORQUE ACCELERATING OPERATION AMOUNT (Ap)

(D) DECREASING GRADIENT (KTdwn) OF TORQUE STEER REDUCING TORQUE

ACCELERATING OPERATION AMOUNT (Ap)

(a) INCREASING GRADIENT (KTup) OF TORQUE STEER REDUCING TORQUE (b) MAXIMUM VALUE (Ttsm) OF TORQUE STEER REDUCING TORQUE (c) HOLDING TIME (Thld) OF MAXIMUM TORQUE STEER REDUCING TORQUE ACCELERATING OPERATION SPEED (dAp)

(d) DECREASING GRADIENT (KTdwn) OF TORQUE STEER REDUCING TORQUE

ACCELERATING OPERATION SPEED (dAp)

STEERING CONTROL APPARATUS FOR A VEHICLE

This application claims priority under 35 U.S.C. Sec. 119 to No. 2006-165663 filed in Japan on Jun. 15, 2006, the entire content of which is herein incorporated by reference.

BACKGROUND OF THE INVENTION

The present invention relates to a steering control apparatus for a vehicle, and particularly relates to a steering control apparatus for reducing steady-state and transient torque steer resulted from layouts and characteristics of drive shafts of a vehicle.

In general, in a steering apparatus for a vehicle with steered wheels thereof being served as its driving wheels, such a phenomenon that steering effort or steer-holding force shall vary in response to variation of driving force, is called as torque steer, which is desired to be restrained. For example, Japanese Patent Laid-open Publication No. 11-129927, which corresponds to U.S. Pat. No. 6,154,696, discloses a vehicle equipped with an electric power steering device and a torque split arrangement for individually controlling (or, distributing) traction and/or braking force between right and left wheels), to improve its maneuverability and stability. In the U.S. Pat. No. 6,154,696, there is disclosed a steering control system for controlling torque steer in a vehicle equipped with an electric power steering device and a torque split arrangement for individually controlling traction and/or braking force of right and left wheels, which comprises a torque difference input unit for receiving a torque difference signal corresponding to a difference in traction and/or braking force between the right and left wheels, a torque steer canceling steering torque determining unit for producing a torque steer canceling steering torque signal that is required to cancel a steering torque arising from the difference in traction and/or braking force between the right and left wheels, and a drive circuit for supplying a drive current to the electric power steering device according to the torque steer canceling steering torque signal.

Furthermore, according to Japanese Patent Laid-open Publication No. 2005-170116, an apparatus is proposed to solve such a problem in the prior art as described above that the torque steer cancelling control is performed only when the difference in force was caused between the right and left wheels, i.e., difference in rotation was caused between the right and left wheels. That is, there is proposed a steering control apparatus, wherein, instead of the difference in rotation between the right and left wheels, by watching a difference in transferring torque between right and left driving axles, which might cause the torque steer, detecting or estimating engine torque to cancel the torque steer, and obtaining an estimated value of torque steer by a memory circuit which memorizes a relationship of the difference in transferring torque between the right and left driving axles against the engine torque, to cancel the torque steer created by the difference in transferring torque between the right and left driving axles. With respect to the vehicle with steered wheels thereof being served as its driving wheels, according to Japanese Patent Laid-open Publication No. 5-77653, a driving force distribution apparatus is proposed for distributing the driving force to right and left wheels of a vehicle of four-wheel drive system, or the like.

However, it is still difficult to sufficiently reduce a transient torque steer as described later, according to compensation based on the relationship of the difference in transferring torque between the right and left driving axles against the engine torque, as described in Japanese Patent Laid-open Publication No. 2005-170116.

Hereinafter, the cause for creating the torque steer will be analyzed. The torque steer is meant by a phenomenon, wherein according to a front engine front drive vehicle (so called FF vehicle) or four-wheel drive vehicle with the steered wheels thereof being served as its driving wheels, the steering wheel is steered by the steered wheels, when the vehicle is accelerated, i.e., the phenomenon with the steered wheels provided for steering the steering wheel. As for the cause for creating the torque steer, mainly raised are "bent angle of a constant speed universal joint for drive shafts" and "difference in driving force between right and left wheels, when a kingpin offset is provided."

At the outset, will be explained "torque steer caused by bent angle of a constant speed universal joint for drive shafts", as (1). With respect to the relationship between the drive shafts and wheels, supposing that the bent angle θ of the constant speed universal joint for the drive shafts is provided, as shown in FIG. 17, if the driving torque transferred by the drive shafts is indicated by "Tdrv", secondary couple moment (Mz) is created for steering the wheels, according to the following equation (1);

$$Mz = Tdrv \cdot \tan(\theta/2) \qquad (1)$$

In FIG. 18, according to the vehicle with the steered wheels thereof being served as its driving wheels, a part of it including its steering apparatus is disclosed to clarify the corresponding relationship between its front view and plan view. That is, in FIG. 18, according to the vehicle with an engine EG and a transmission TR arranged in a transverse direction to the vehicle moving direction, to obtain a space efficiency in an engine compartment, length and arrangement of the drive shafts (maybe called as drive axles) DS1 and DS2 are not provided symmetrically in the transverse direction. Therefore, in the case where the joint bent angles for the drive shafts connected to the driving wheels are different between the right and left wheels WH1 and WH2, a moment (Mz) for steering the wheels, or called as a steered torque, will be caused to provide its difference between the right and left wheels WH1 and WH2, to create the torque steer for steering the steering wheel SW by the steered wheels when the vehicle is accelerated. Thus, the torque steer caused by the bent angle of the constant speed universal joint for the drive shafts is called as the steady-state torque steer.

Next will be explained "torque steer caused by the difference in driving force between the right and left wheels, when the kingpin offset is provided", as (2). As shown in FIG. 18, the steered wheels WH1 and WH2 are provided with kingpins KP1 and KP2 to be capable of being steered, and the position of the steered center TC, i.e., intersection of the kingpin axis and road surface, does not correspond to the position of force applied point DP of the driving force, so that there exists a distance between those two points, i.e., kingpin offset (KPo), whereas (KPc) in FIG. 18 designates a wheel center kingpin offset. In the case where there exists the kingpin offset (KPo), when the vehicle is accelerated to apply the driving force to the steered wheels WH1 and WH2, the torque for steering the steered wheel, i.e., steered torque, is created, which can be obtained by [driving force]×[kingpin offset]. If the driving force is equal to each other between the right and left wheels WH1 and WH2, the steered torque will be cancelled, so that no torque steer will be caused. If the driving force is different from each other between the right and left wheels WH1 and WH2, however, "torque steer for steering the steering wheel by means of the steered wheel (right and left wheels)" will be caused.

As for the case where the driving force is different from each other between the right and left wheels as described in (2), the following three cases may be considered:

(2-a) "driving force difference between right and left wheels due to characteristics of drive shafts"

In the case where there exists a difference in characteristic between the drive shafts DS1 and DS2, a transient (dynamic) difference will be caused in transferring the torque. Even in the case where the drive shafts DS1 and DS2 are made of the same material, and formed with the same cross sectional area, if their lengths are different from each other, torsional rigidity of them shall be different from each other. Therefore, when the vehicle is accelerated rapidly, the driving force applied to the wheel connected with the drive shaft, which is relatively short to provide relatively high torsional rigidity, will be increased rapidly with a slight delay. On the contrary, the driving force applied to the wheel connected with the drive shaft, which is relatively long to provide relatively low torsional rigidity, will be increased gradually. Therefore, the difference in transient driving force will be caused between the right and left wheels, thereby to create the torque steer, which is called as the transient torque steer.

(2-b) "driving force difference between right and left wheels due to a traction control"

If braking torque is applied to one wheel according to a traction control, the driving force applied to the other one wheel corresponding to the braking torque will be increased. Particularly, in the case where the traction control is performed on a so-called μ-split road with different coefficients of friction provided between the right and left wheels, the driving force difference between the right and left wheels will be caused largely.

(2-c) "driving force difference between right and left wheels due to a driving force distribution device"

In the case where a driving force distribution device is provided between the right and left wheels, the difference in driving force between the right and left wheels will be caused. As for the driving force distribution device, there are known the one controlled electronically, and the one for limiting their differential mechanically, e.g., viscous coupling or the like, as disclosed in the aforementioned Japanese Patent Laid-open Publication No. 5-77653, for example.

SUMMARY OF THE INVENTION

Accordingly, it is an object of the present invention to provide a steering control apparatus for reducing torque steer effectively by means of a simple device, in particular, to effectively reduce transient torque steer caused by difference in driving force between right and left wheels due to characteristics of drive shafts, e.g., difference in torsional rigidity of the drive shafts, when accelerating operation becomes equal to or greater than a predetermined value.

In accomplishing the above and other objects, the steering control apparatus is provided for a vehicle having a steering wheel for steering steered wheels of the vehicle, a power source for generating power, and drive shafts for transferring the power to the steered wheels that serve as driving wheels of the vehicle. The apparatus comprises an accelerating operation detection device for detecting an accelerating operation amount indicating an amount of vehicle acceleration desired by a vehicle driver, and a steering torque control device for controlling steering torque created by the steering wheel, and applying torque steer reducing torque to the steering wheel to reduce torque steer, which is transiently created on the steering wheel due to characteristics of the drive shafts, the torque steer reducing torque being applied when the accelerating operation amount detected by the accelerating operation detection device becomes equal to or greater than a predetermined value.

Preferably, the steering torque control device may output the torque steer reducing torque in a pulse wave form.

The steering control apparatus may further comprise an accelerating operation speed detection device for calculating variation of the accelerating operation amount to determine accelerating operation speed, and the steering torque control device may be adapted to determine a shape of the pulse wave form on the basis of at least one of the accelerating operation amount detected by the accelerating operation detection device and the accelerating operation speed detected by the accelerating operation speed detection device.

In the steering control apparatus, the vehicle may comprise a transmission disposed between the power source and the drive shafts, and the steering torque control device may be adapted to prohibit applying the torque steer reducing torque to the steering wheel, when a speed reducing gear ratio of the transmission is smaller than a predetermined ratio.

The steering control apparatus may further comprise a vehicle speed detection device for detecting a vehicle speed of the vehicle, and the steering torque control device may be adapted to prohibit applying the torque steer reducing torque to the steering wheel, when the vehicle speed detected by the vehicle speed detection device is greater than a predetermined speed.

In the steering control apparatus, the torque steer reducing torque is determined in advance, and the steering torque control device may be adapted to apply the torque steer reducing torque to the steering wheel in one direction based on the characteristics of the drive shafts and whether a turning operation of the steering wheel is a right turning operation or a left turning operation.

In the steering control apparatus as described above, the steering torque control device may be adapted to control steering torque created by the steering wheel, and applying a torque steer reducing torque to the steering wheel to reduce the torque steer, which is transiently created on the steering wheel due to characteristics of the drive shafts, the torque steer reducing torque being applied when the vehicle speed detected by the vehicle speed detection means is approximately zero and when the accelerating operation amount detected by the accelerating operation detection device becomes equal to or greater than a predetermined value, in a situation in which the vehicle has started.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENTS

Figure 1:
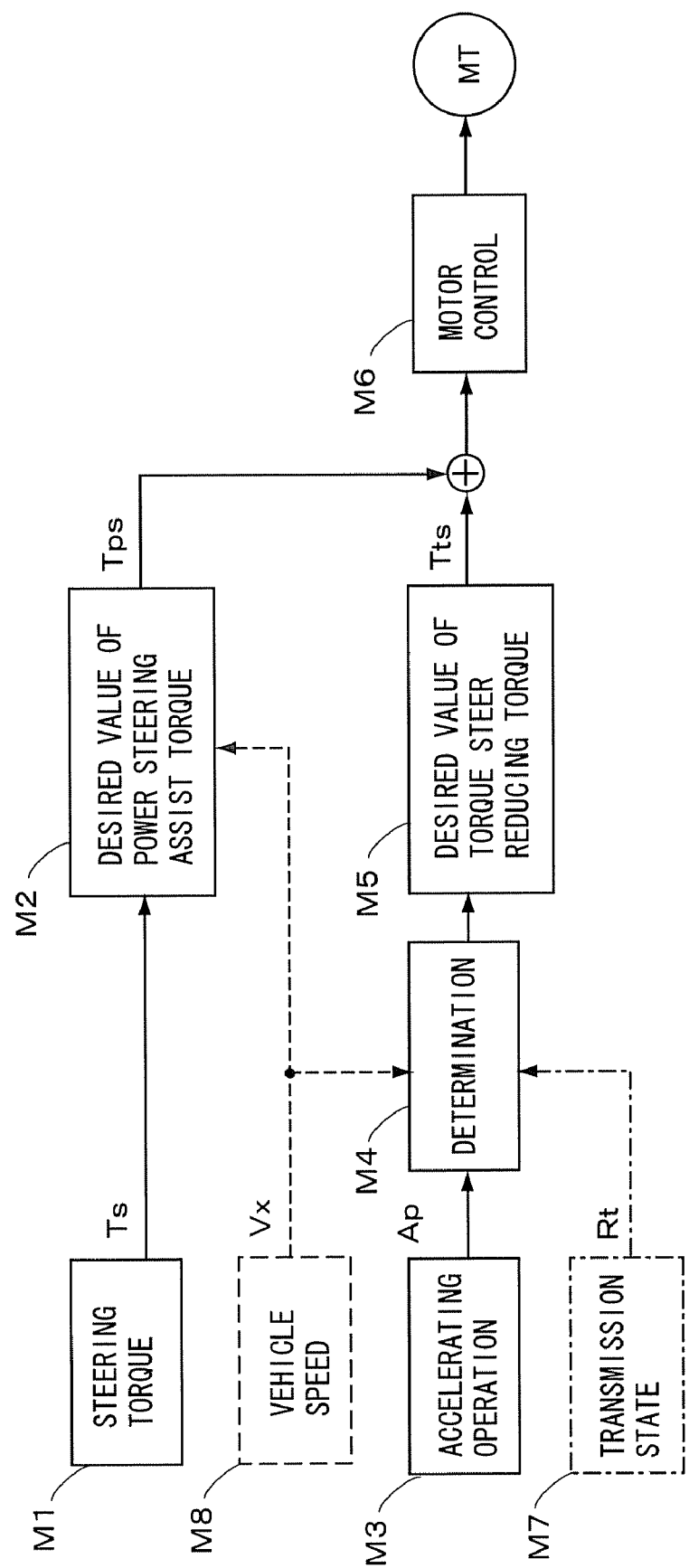
FIG. 1 is a schematic block diagram of a steering control apparatus according to an embodiment of the present invention.
Figure 2:
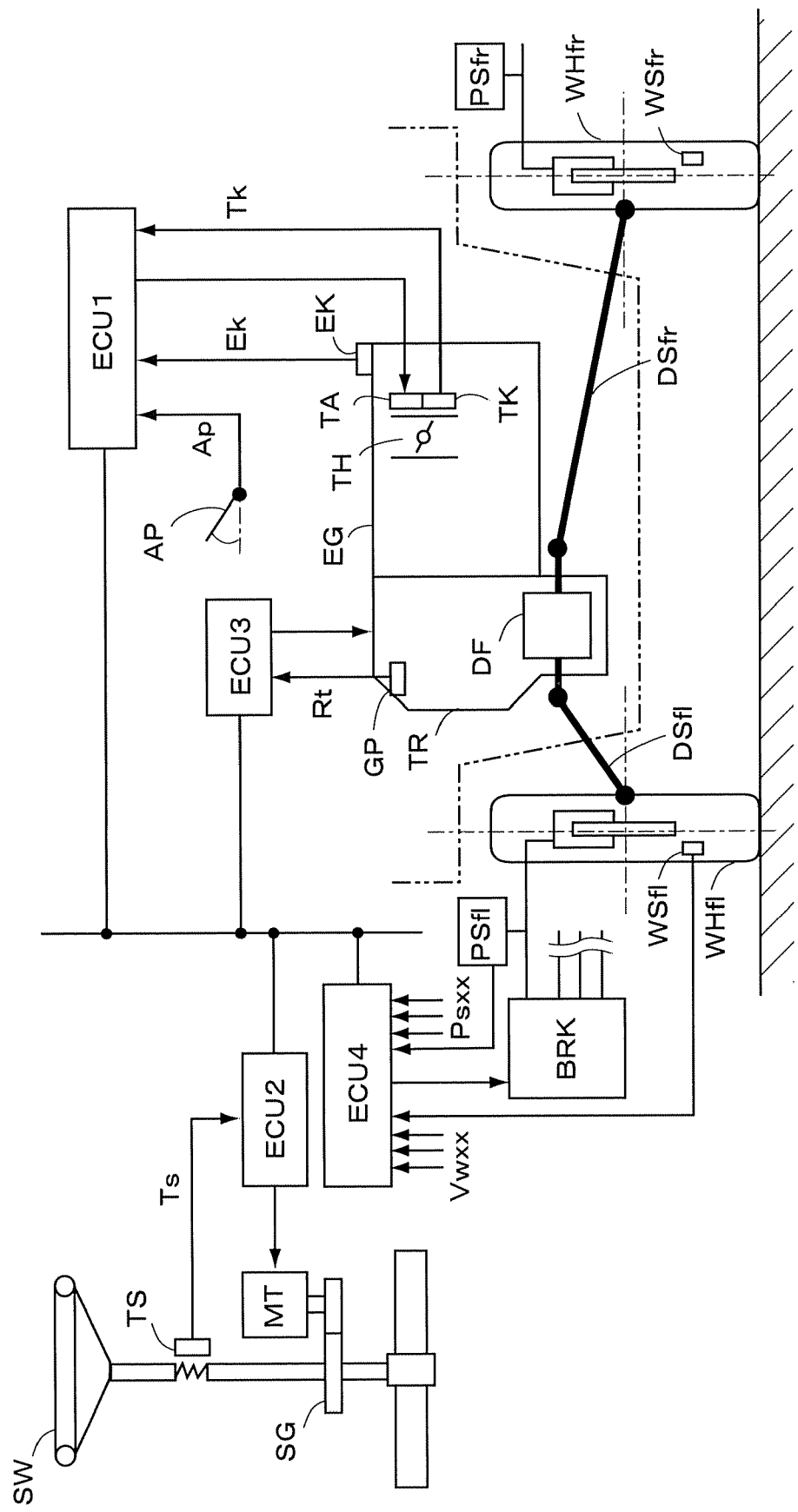
FIG. 2 is a schematic block diagram of a vehicle having a steering control apparatus according to an embodiment of the present invention.

Referring to FIG. 1, there is schematically illustrated a steering control apparatus according to an embodiment of the present invention, which is installed in a vehicle as shown in FIG. 2, for example. That is, the apparatus is installed in the vehicle, which includes a steering wheel SW adapted to steer wheels WHfr and WHfl served as steered wheels, an engine EG served as a power source for generating power, and drive shafts DSfr and DSfl adapted to transfer the power to the wheels WHfr and WHfl, which are also served as driving wheels. The apparatus includes a steering torque control device, wherein steering wheel torque (simply referred to as steering torque) (Ts) of the steering wheel SW is detected by a steering torque detection device M1 as shown in FIG. 1, and on the basis of the detected result, a desired value of torque served as an assist torque for assisting the power steering control to reduce the steering force applied by the vehicle driver, is calculated by a determination device M2 for determining the desired value of power steering assist torque, to output a desired value (Tps) of the assist torque.

On the other hand, accelerating operation of a vehicle driver is detected by an accelerating operation detection device M3, to output accelerating operation amount (Ap). This accelerating operation amount (Ap) can be detected at any part between the accelerating operation of the vehicle driver and input to the power source for generating the power. For example, if the operation of the vehicle driver is to be detected directly, amount of operation of an accelerator pedal is employed as the accelerating operation amount (Ap). And, if the input to the power source is to be detected, throttle opening for an gasoline engine, amount of injected fuel for a diesel engine, or driving current or voltage for an electric motor is employed as the accelerating operation amount (Ap). Therefore, as far as information can be detected by the one to be classified in the information sources as described above, any device other than those sources can be used for the accelerating operation detection device. On the basis of the result detected by the accelerating operation detection device M3, therefore, it is determined by a determination device M4 whether the torque steer reducing torque is to be applied.

According to the determination device M4, the torque steer reducing torque may be allowed to be applied, when the accelerating operation amount (Ap) becomes equal to or greater than a predetermined amount (Ap1). Or, after the accelerating operation speed (dAp) is calculated on the basis of the torque steer reducing torque may be allowed to be applied, when the accelerating operation amount (Ap) becomes equal to or greater than the predetermined amount (Ap1), and when the accelerating operation speed (dAp) becomes equal to or greater than the predetermined speed (dAp1). This is because the transient driving force difference between the drive shafts will not be caused, provided that variation of the accelerating operation is varied gradually, even if the accelerating operation amount is large, whereby the transient torque steer will not be created.

Then, a desired value (Tts) of the torque steer reducing torque is determined by a determination device M5 for determining the desired value of the torque steer reducing torque. The desired value (Tts) of the torque steer reducing torque is determined to provide a pulse wave form, as described later. This pulse wave form may be provided as a fixed form, which is set in advance. Furthermore, the pulse wave form may be provided as a variable form, on the basis of at least one of the accelerating operation amount (Ap) and accelerating operation speed (dAp). Accordingly, the desired value (Tts) of the torque steer reducing torque is added to the desired value (Tps) of the assist torque, which is provided for the power steering control as described above, and the electric motor MT is controlled by a motor drive control device M6.

In addition, as indicated by one-dot chain line in FIG. 1, the apparatus may be provided with a transmission state detection device M7, to provide a speed reducing gear ratio (Rt) of the transmission TR as shown in FIG. 2, for the determination made by the determination device M4. Since the power generated by the power source (engine EG) is amplified by the speed reducing gear ratio, i.e., [gear ratio]×[last speed reducing ratio] of the transmission TR, the driving torque transferred to the drive shafts will not be made so large as to create the torque steer, when the gear ratio (Rt) of the transmission TR is small. Therefore, in the case where the gear ratio (Rt) of the transmission TR is smaller than a predetermined ratio (Rt1), the torque steer reducing torque may be prohibited from being applied, thereby to restrain unnecessary change in steering torque, even if the accelerating operation amount (Ap) becomes equal to or greater than a predetermined amount (Ap1). Also, as the vehicle speed is increased, the transmission TR is shifted up, to decrease the speed reducing gear ratio, a vehicle speed detection device M8 may be provided as indicated by one-dot chain line in FIG. 1, whereby in the case where the vehicle speed (Vx) becomes larger than a predetermined speed (Vx1), the torque steer reducing torque may be prohibited from being applied.

The steering control apparatus is installed in the vehicle as shown in FIG. 2, and the engine EG is installed transversely in the engine compartment together with the transmission TR. Within the transmission TR, a differential device DF is disposed, to distribute the power generated by the engine EG to the wheels WHfr and WHfl, which are served as the steered wheels and driving wheels. In the vehicle, an electronic engine control unit ECU1 for controlling the engine EG, an electronic steering control unit ECU2 for controlling the steering system, and an electronic transmission control unit ECU3 for controlling the transmission, and an electronic brake control unit ECU4 for controlling a brake system (BRK and etc.) are connected to one another through a communication bus, so that sensor signals and the information for each control unit can be provided commonly. The engine EG is provided with a throttle valve TH for controlling an engine output. The opening of the throttle valve TH is adjusted by a throttle actuator TA, and its throttle opening (Tkc) is detected by a throttle opening sensor TK. Also, an engine speed sensor EK is provided for detecting an engine rotational speed (Ek). And, the vehicle driver's requirement for acceleration is detected by an accelerator pedal sensor AP, as the amount of operation (Ap) of an accelerator pedal (not shown). On the basis of the detected results such as the amount of operation (Ap) of the accelerator pedal, engine rotational speed (Ek) and throttle opening (Tk), therefore, the throttle actuator TA is controlled by the electronic engine control unit ECU1. According to the present embodiment, the vehicle is provided with the gasoline engine EG as the power source, while known power sources for generating the power may be employed, including an internal combustion engine such as the diesel engine or the like, an electric motor used in an electric vehicle (abbreviated as "EV"), and a combination of them used in a hybrid vehicle (abbreviated as "HEV").

On the other hand, as for the steering system, the steering torque applied to the steering wheel SW is controlled, on the basis of the result detected by the steering torque sensor TS. In practice, the electronic steering control unit ECU2 is so constituted that the electric motor MT is controlled in response to the steering torque (Ts) detected by the steering torque sensor TS. Also, it may be so constituted that the electric motor MT is controlled, taking the vehicle speed (Vx) into consideration. This control is a so-called power steering control, and may be called as an electric power steering control, because the electric motor MT is used.

Furthermore, when the vehicle is accelerated, for example, created is the torque steer phenomenon, wherein the wheels WHfr and WHfl are forced to steer the steering wheel SW. The torque steer reducing torque for reducing the torque steer phenomenon is provided by the electric motor MT, as described later. The control for reducing the torque steer is called as "torque steer reducing control". In the transmission TR, a gear position sensor GP is disposed for detecting the gear ratio (Rt), which is output to the electronic transmission control unit ECU3. As for the transmission TR, known transmissions such as a manual transmission, automatic transmission, continuously variable transmission (CVT) or the like my be used. Since the electronic brake control unit ECU4 is connected to the communication bus, into which wheel speeds detected by wheel speed sensors WS are fed, the vehicle speed (Vx) can be calculated on the basis of the detected wheel speeds.

Figure 3:
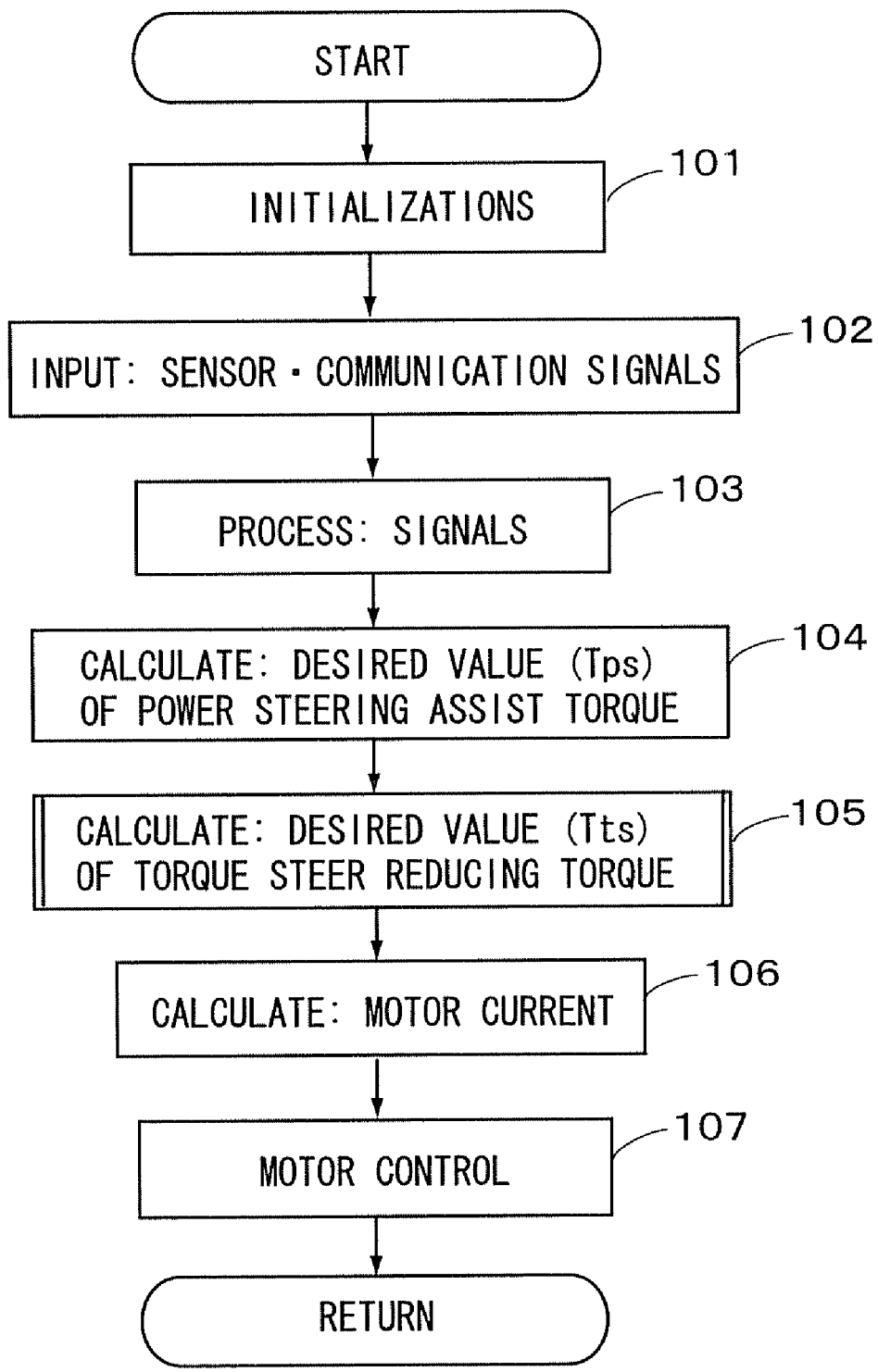
FIG. 3 is a flowchart of an example of steering control according to an embodiment of the present invention.

Next will be explained operation of the steering control apparatus as constituted above, referring to the flowchart as shown in FIG. 3. At the outset, the program provides for initialization of the system at Step 101, and the signals detected by various sensors and communication signals on the communication bus are read at Step 102. Then, the program proceeds to Step 103, where the signals are processed by filtering or the like. Next, at Step 104, the desired value (Tps) of the assist torque provided for the power steering control is calculated on the basis of steering torque (Ts). Then, the program proceeds to Step 105, where the desired value (Tts) of the torque steer reducing torque is calculated, as will be explained later with reference to FIG. 4. The program further proceeds to Step 106, where the desired value (Tts) of the torque steer reducing torque is added to the desired value (Tps) of the assist torque, so that a current command value to the electric motor MT is calculated on the basis of the added result. Then, on the basis of the current command value, the electric motor MT is controlled at Step 107.

Figure 4:
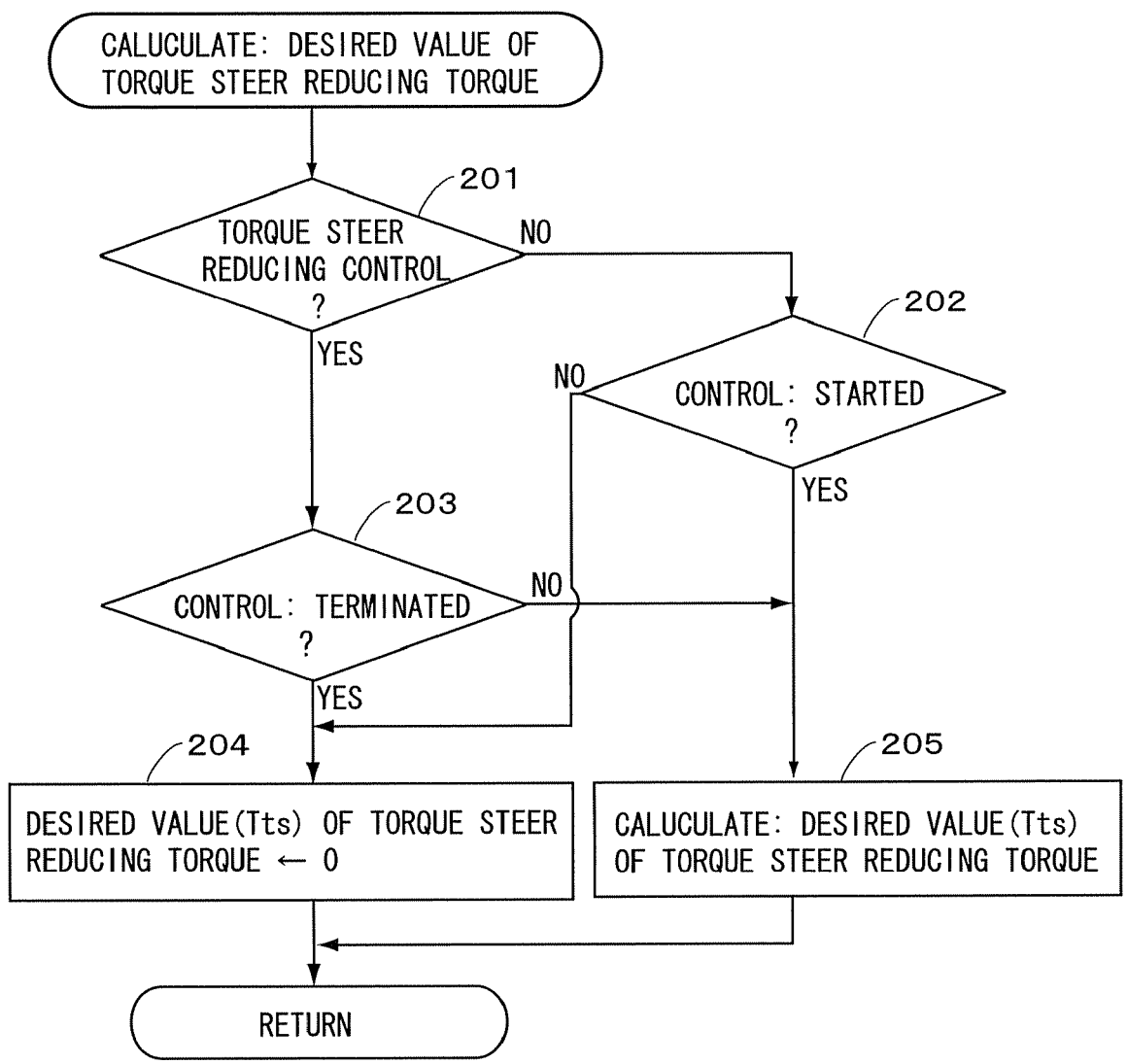
FIG. 4 is a flowchart of an example for calculating a desired value of torque steer reducing torque according to an embodiment of the present invention.

The desired value (Tts) of the torque steer reducing torque as described above is calculated according to the flowchart as shown in FIG. 4. At the outset, it is determined at Step 201, whether the torque steer reducing control is being performed, or not. If it is determined that the control is not being performed, the program proceeds to Step 202, where it is determined whether the torque steer reducing control is to be started, or not. Herein, if the accelerating operation amount (Ap) is equal to or greater than the predetermined amount (Ap1), it is determined that the torque steer reducing control is to be started. If it is determined at Step 202 that the torque steer reducing control is not required, the program proceeds to Step 204, where the desired value (Tts) of the torque steer reducing torque is set to be zero (0). Instead, if it is determined that the torque steer reducing control is required, the program proceeds to Step 205, where the desired value (Tts) of the torque steer reducing torque is calculated.

On the other hand, if the torque steer reducing control is being performed, the program proceeds from Step 201 to Step 203, where it is determined whether the torque steer reducing control is to be terminated, or not. If it is determined that the torque steer reducing control is not to be terminated, the program proceeds to Step 205, where the desired value of torque steer reducing torque is calculated. And, if the conditions for terminating the torque steer reducing torque are fulfilled, the desired value of the torque steer reducing torque is set to be zero at Step 204.

Figure 5:
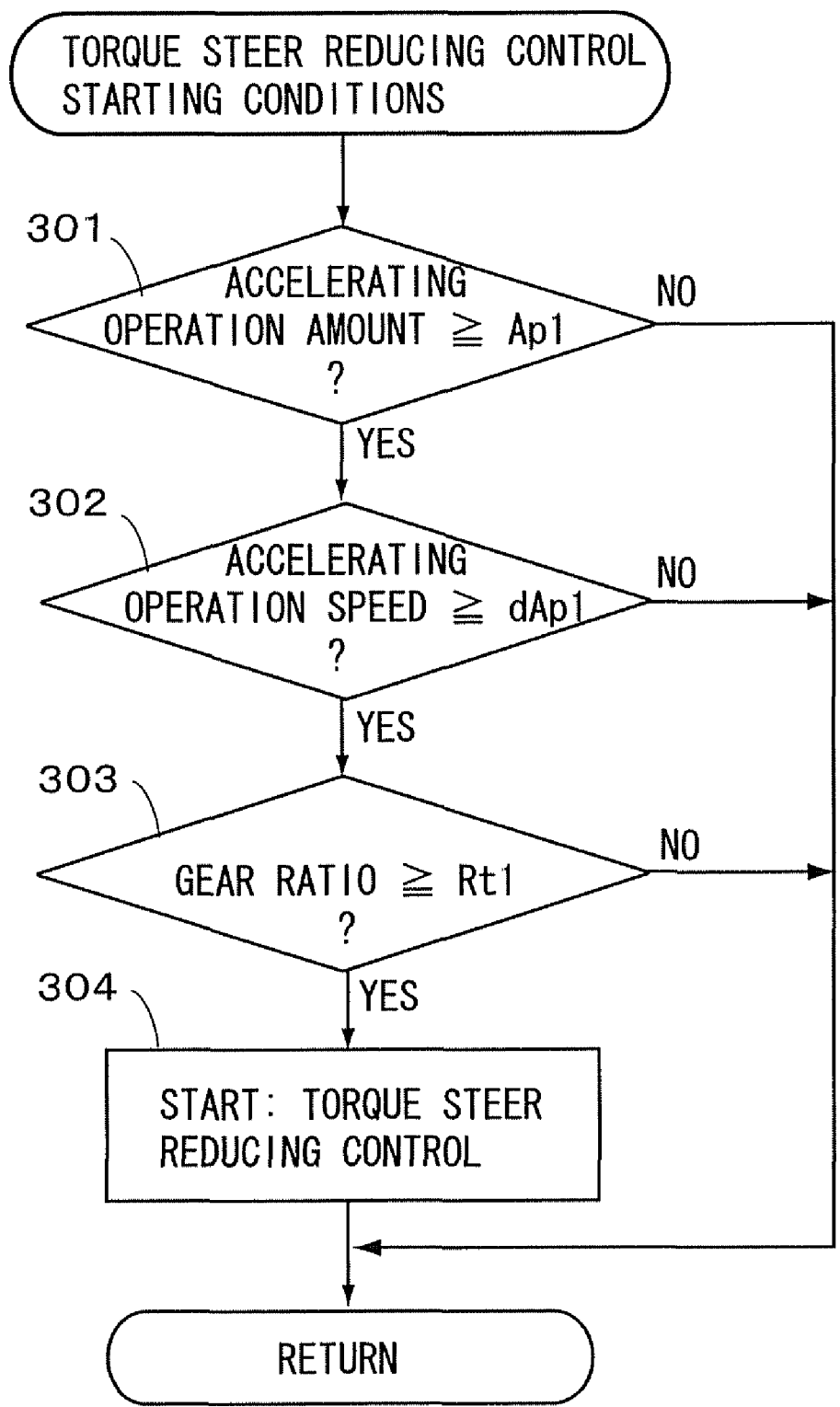
FIG. 5 is a flowchart of an example of torque steer reducing control starting conditions according to an embodiment of the present invention.

The conditions for starting the torque steer reducing control used at Step 202 are determined according to the flowchart as shown in FIG. 5. At the outset, at Step 301, the read amount of accelerating operation of the accelerator pedal AP by the vehicle driver, i.e., accelerating operation amount (Ap), is compared with the predetermined amount (Ap1). If it is determined that the accelerating operation amount (Ap) is equal to or greater than the predetermined amount (Ap1), the program proceeds to Step 302, where the accelerating operation speed (dAp), which is a variation in time of the accelerating operation amount (Ap), is compared with the predetermined speed (dAp1). If it is determined at Step 302 that the accelerating operation speed (dAp) is equal to or greater than the predetermined speed (dAp1), the program proceeds to Step 303, where the gear ratio (Rt) of the transmission TR is compared with the predetermined ratio (Rt1). Accordingly, if it is determined at Step 303 that the gear ratio (Rt) of the transmission TR is equal to or greater than the predetermined ratio (Rt1), the program proceeds to Step 304, where the torque steer reducing control is achieved.

On the other hand, if it is determined at Step 301 that the accelerating operation amount (Ap) is smaller than the predetermined amount (Ap1), large driving torque will not be transferred to the drive shafts DS1 and DS2, so that the transient torque steer will not be caused. Therefore, without performing the torque steer reducing control, the program will return to the routine as shown in FIG. 4. Also, if it is determined at Step 302 that the accelerating operation speed (dAp) is smaller than the predetermined speed (dAp1), thereby to provide the gradual accelerating operation, the transient torque steer will not be caused, so that the torque steer reducing control will not be performed. Furthermore, as the driving force generated by the power source is increased in accordance with the speed reducing gear ratio, if the gear ratio (Rt) of the transmission TR is smaller than the predetermined ratio (Rt1), the driving torque transferred to the drive shafts will be small, so that the transient torque steer will not be caused. Therefore, the torque steer reducing control will not be performed.

Although it is determined at Step 303 on the basis of the speed reducing gear ratio as described above, if the vehicle speed is increased, the transmission TR will be shifted up, to be changed into a lower speed reducing gear ratio. Therefore, instead of the process performed at Step 303, if the vehicle speed (Vx) is greater than the predetermined speed (Vx1), it may be so constituted that the torque steer reducing control will be prohibited.

Figure 6:
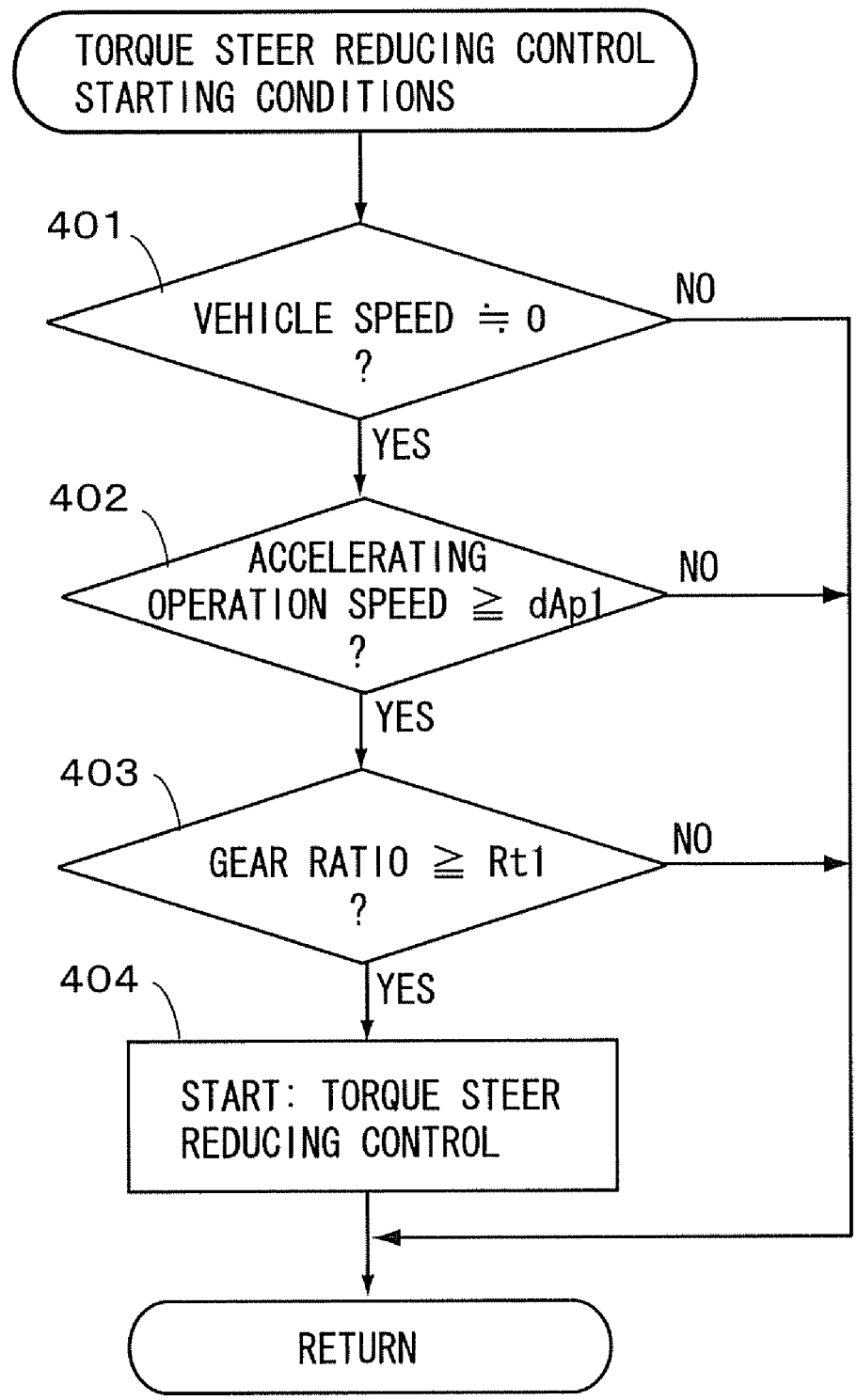
FIG. 6 is a flowchart of another example of torque steer reducing control starting conditions according to an embodiment of the present invention.

In the mean time, the transient torque steer due to the characteristics of the drive shafts is likely caused, when the vehicle has started. Therefore, as shown in FIG. 6, it may be so constituted that the torque steer reducing control is to be performed, when the vehicle has started, i.e., when the vehicle speed (Vx) is approximately zero (0). That is, if it is determined at Step 401 that the vehicle speed (Vx) is approximately zero, the program proceeds to Step 402, where the accelerating operation amount (Ap) is compared with the predetermined amount (Ap1). If it is determined that the accelerating operation amount (Ap) is equal to or greater than the predetermined amount (Ap1), the program proceeds to Step 403, where the accelerating operation speed (dAp) is compared with the predetermined speed (dAp1). Accordingly, if it is determined that the accelerating operation speed (dAp) is equal to or greater than the predetermined speed (dAp1), the program proceeds to Step 404, where the torque steer reducing control will be started. Instead, if the conditions provided at Steps 401-403 are not fulfilled, the torque steer reducing control shall not be performed.

Figure 7:
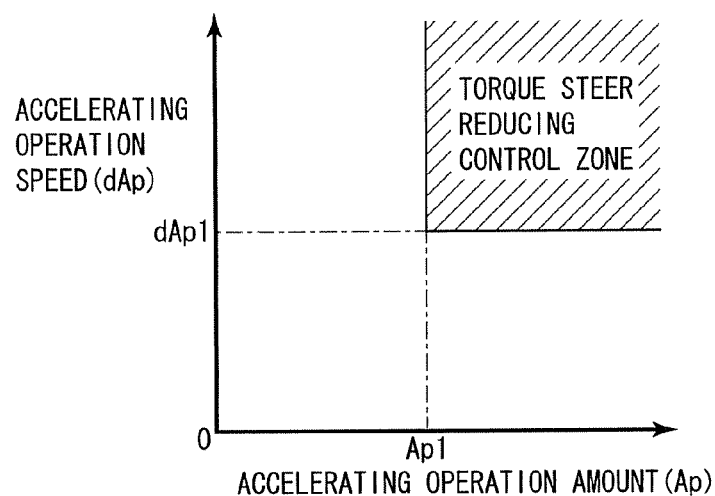
FIG. 7 is a diagram showing an example of a map for providing a torque steer reducing control zone, according to an embodiment of the present invention.
Figure 8:
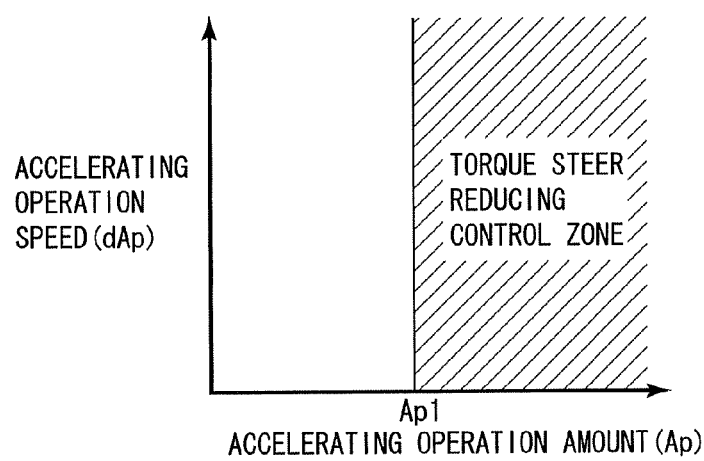
FIG. 8 is a diagram showing another example of a map for providing a torque steer reducing control zone, according to an embodiment of the present invention.
Figure 9:
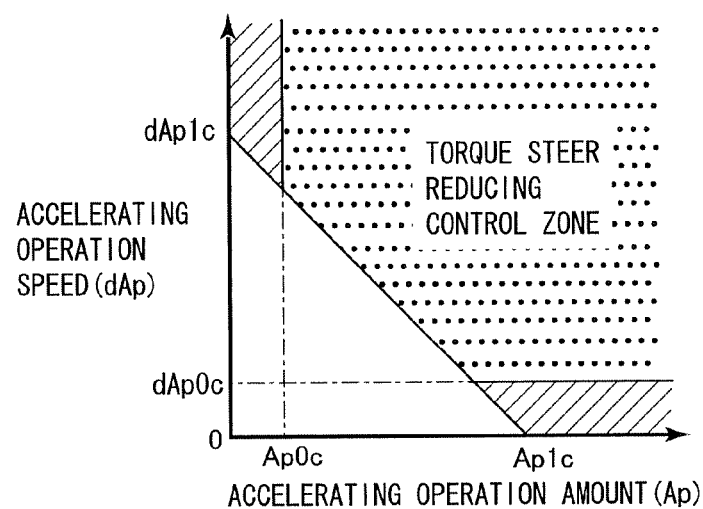
FIG. 9 is a diagram showing a further example of a map for providing a torque steer reducing control zone, according to an embodiment of the present invention.

At Steps 301 and 302, and Steps 402 and 403, the conditions for starting the torque steer reducing control are set to be the accelerating operation amount of Ap≧Ap1, and the accelerating operation speed of dAp≧dAp1. Therefore, a zone for performing the torque steer reducing control corresponds to the zone with oblique lines as indicated in FIG. 7. The Step 302 or Step 403 may be omitted, and the accelerating operation amount (Ap)≧predetermined amount (Ap1) may be provided for the condition for starting the torque steer reducing control. Then, the zone for performing the torque steer reducing control in this case corresponds to the zone with oblique lines as indicated in FIG. 8. Furthermore, as shown in FIG. 9, the zone for performing the torque steer reducing control as indicated by dots in FIG. 9 can be provided on the basis of a relationship between the accelerating operation amount (Ap) and the accelerating operation speed (dAp), wherein Ap1c and dAp1c are predetermined values used for references. In the case where the accelerating operation amount of Ap<Ap0c, or the accelerating operation speed of dAp<dAp0c, a dead zone as indicated by oblique lines in FIG. 9 may be provided for prohibiting the torque steer reducing control.

Figure 10:
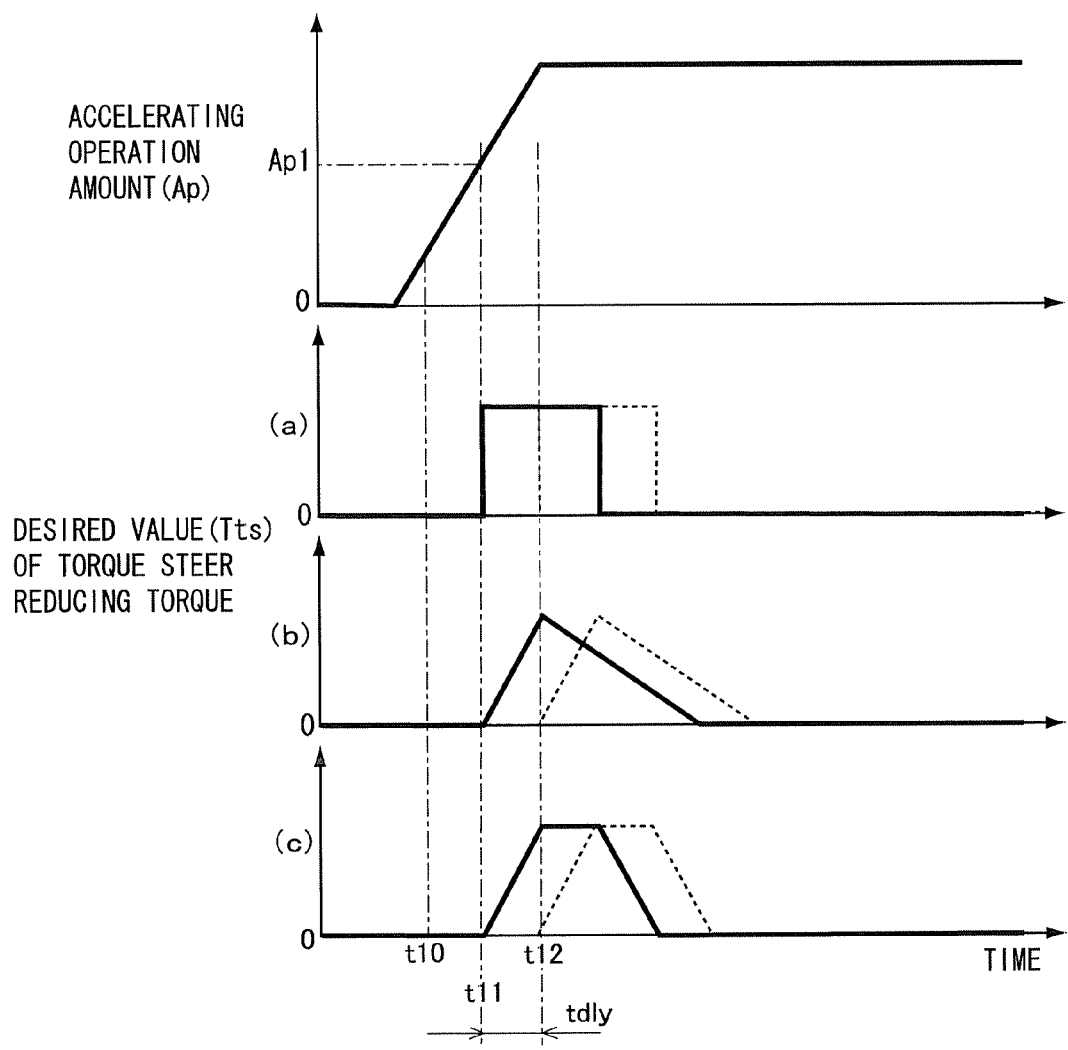
FIG. 10 is a diagram showing an example of a map for providing a desired value of torque steer reducing torque, according to an embodiment of the present invention.

The desired value (Tts) of the torque steer reducing torque used at Step 205 in FIG. 4 is set as shown in FIG. 10. At the outset, when the accelerating operation amount (Ap) has become equal to or greater than the threshold value (Ap1) for starting the control, i.e., at the time of "t11", the desired value (Tts) of the torque steer reducing torque is output in the form of pulse wave. The time series wave form for the desired value (Tts) of the torque steer reducing torque is determined as the fixed pulse wave as predetermined in advance. Since the torque steer phenomenon, wherein the driving wheels are forced to steer the steering wheel, is resulted from the characteristics of the drive shafts, it will be caused only in one direction out of the right and left turning directions, so that the magnitude and direction of the torque steer can be noted in advance. Therefore, even if the wave form of the torque steer reducing torque is fixed, the torque steer can be reduced effectively, while the torque steer can not be cancelled perfectly. The wave form of the desired value of the torque steer reducing torque may be set in a rectangular wave form (a), triangular wave form (b) or trapezoidal wave form (c) as shown in FIG. 10, or may be set in a wave form using function or map (not shown).

Figure 11:
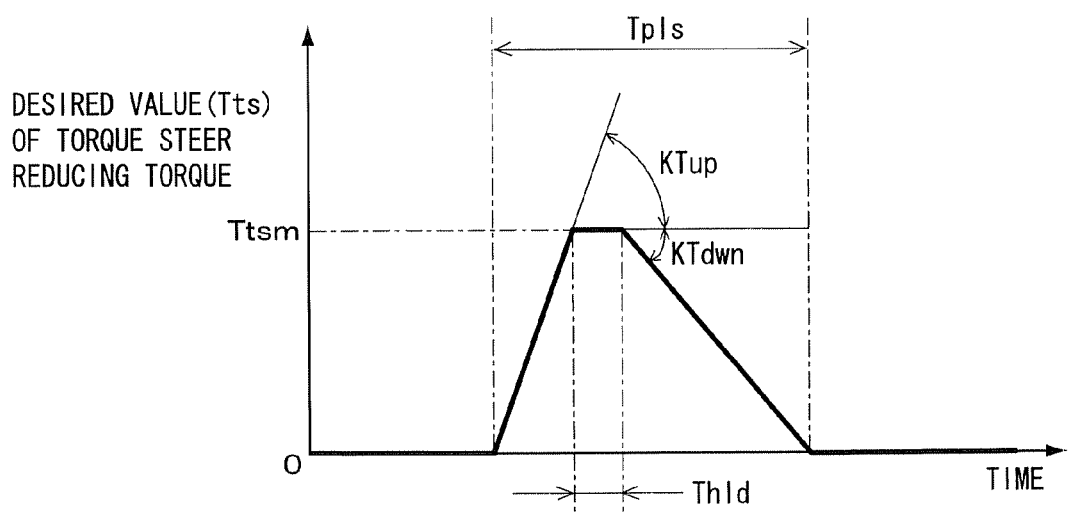
FIG. 11 is a diagram showing parameters of a pulse wave form of a desired value of torque steer reducing torque, according to an embodiment of the present invention.

Or, depending upon the characteristic of the power source, there may be a case where a certain period of time delay will be required from the acceleration of the vehicle driver up to the output of the driving force by the power source. Therefore, like the pulse form as indicated by oblique lines in FIG. 10, the desired value (Tts) of the torque steer reducing torque may be set to be output with a delay of a predetermined time (tdly), after it has become equal to or greater than the threshold value (Ap1) for starting the control. Consequently, the torque steer reducing control can be performed synchronously with the timing of the driving force being transferred to the drive shafts. Furthermore, in order to cancel the torque steer appropriately, the wave form of the desired value (Tts) of the torque steer reducing torque may be provided to be varied in accordance with at least one of the accelerating operation amount (Ap) and the accelerating operation speed (dAp). That is, as shown in FIG. 11, at least more than one of output time (Tpls) of the pulse wave form, increasing gradient (KTup) of the desired value (Tts) of the torque steer reducing torque, maximum value (Ttsm) of the desired value (Tts) of the torque steer reducing torque, holding time (Thld) of the maximum value, and decreasing gradient (KTdwn) of the desired value (Tts) of the torque steer reducing torque, may be set to be varied in accordance with the accelerating operation amount (Ap) or the accelerating operation speed (dAp).

Figure 12:
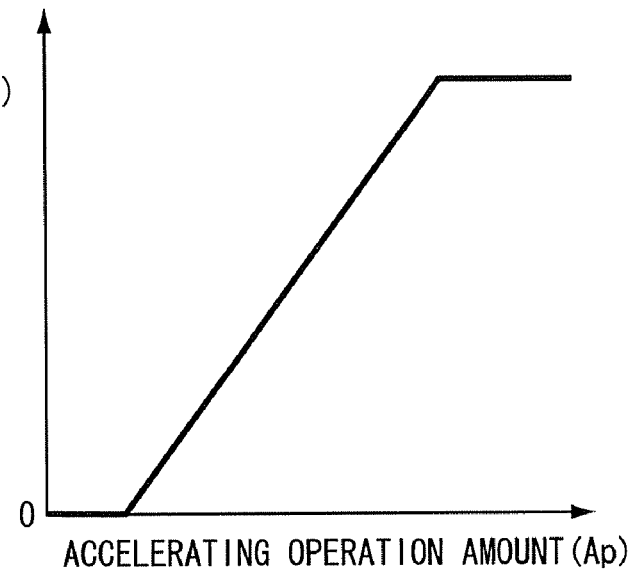
FIG. 12 is a diagram showing an example of a map for providing each parameter of a pulse wave form on the basis of accelerating operation amount, according to an embodiment of the present invention.
Figure 13:
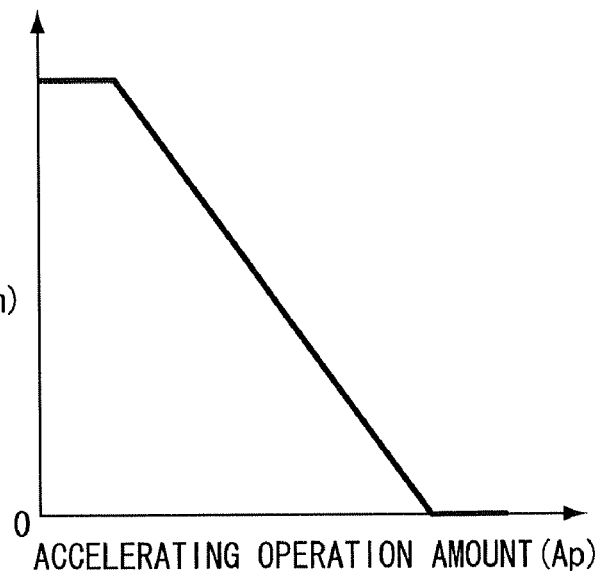
FIG. 13 is a diagram showing an example of a map for providing a parameter of a pulse wave form on the basis of accelerating operation amount, according to an embodiment of the present invention.

Then, in order to reduce the transient torque steer more appropriately, as shown in FIGS. 12 and 13, by setting each parameter in accordance with the accelerating operation amount (Ap), the desired value (Tts) of the torque steer reducing torque can be determined in accordance with the accelerating operation amount (Ap) as follows. The following (A), (B), (C) and (D) correspond to parameters of (A), (B), (C) and (D) as indicated along ordinate axes in FIGS. 12 and 13, respectively. Although scales of the parameters as indicated along the ordinate axis in FIG. 12 are different from each other, their relative relationships with the accelerating operation amount (Ap) are the same, so that three diagrams are disclosed together, while the diagrams do not indicate that the scales are identical.

(A) If the accelerating operation amount (Ap) is large, the increasing gradient (KTup) of the desired value (Tts) of the torque steer reducing torque may be set to be large, thereby to increase the torque steer reducing torque rapidly.

(B) If the accelerating operation amount (Ap) is large, the maximum value (Ttsm) of the desired value (Tts) of the torque steer reducing torque may be set to be large, thereby to provide the torque steer reducing torque more largely.

(C) If the accelerating operation amount (Ap) is large, the holding time (Thld) of the maximum value (Ttsm) of the desired value (Tts) of the torque steer reducing torque may be set to be long, thereby to provide the torque steer reducing torque sufficiently.

(D) If the accelerating operation amount (Ap) is large, the decreasing gradient (KTdwn) of the desired value (Tts) of the torque steer reducing torque may be set to be small, thereby to decrease the torque steer reducing torque gradually.

Figure 14:
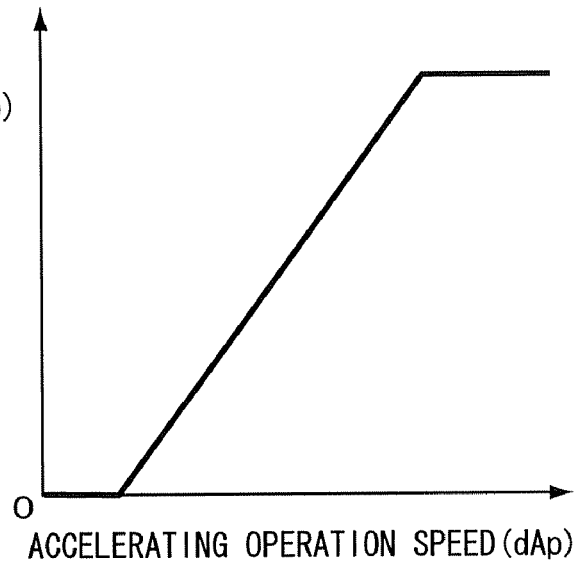
FIG. 14 is a diagram showing an example of a map for providing each parameter of a pulse wave form on the basis of accelerating operation speed, according to an embodiment of the present invention.
Figure 15:
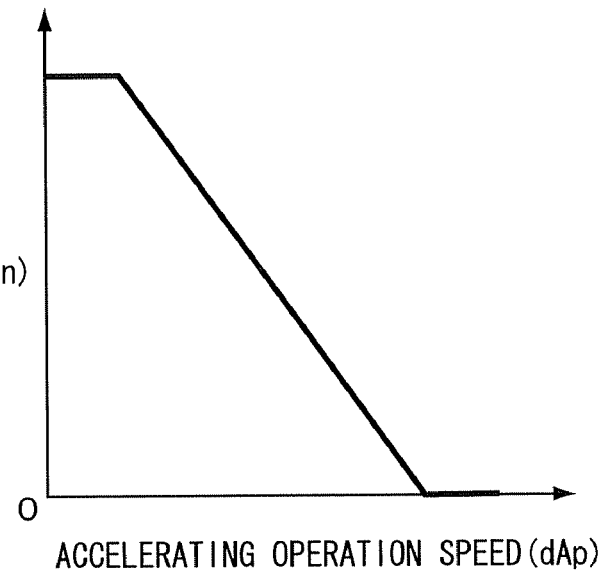
FIG. 15 is a diagram showing an example of a map for providing a parameter of a pulse wave form on the basis of accelerating operation speed, according to an embodiment of the present invention.

Likewise, in order to reduce the transient torque steer more appropriately, as shown in FIGS. 14 and 15, by setting each parameter in accordance with the accelerating operation amount (Ap), the desired value (Tts) of the torque steer reducing torque can be determined in accordance with the accelerating operation amount (Ap) as follows. The following (a), (b), (c) and (d) correspond to parameters of (a), (b), (c) and (d) as indicated along ordinate axes in FIGS. 14 and 15, respectively. With respect to the parameters as indicated along the ordinate axis in FIG. 14, it does not indicate that the scales are identical, like in FIG. 12.

(a) If the accelerating operation speed (dAp) is large, the increasing gradient (KTup) of the desired value (Tts) of the torque steer reducing torque may be set to be large, thereby to increase the torque steer reducing torque rapidly.

(b) If the accelerating operation speed (dAp) is large, the maximum value (Ttsm) of the desired value (Tts) of the torque steer reducing torque may be set to be large, thereby to provide the torque steer reducing torque more largely.

(c) If the accelerating operation speed (dAp) is large, the holding time (Thld) of the maximum value (Ttsm) of the desired value (Tts) of the torque steer reducing torque may be set to be long, thereby to provide the torque steer reducing torque sufficiently.

(d) If the accelerating operation speed (dAp) is large, the decreasing gradient (KTdwn) of the desired value (Tts) of the torque steer reducing torque may be set to be small, thereby to decrease the torque steer reducing torque gradually.

Figure 16:
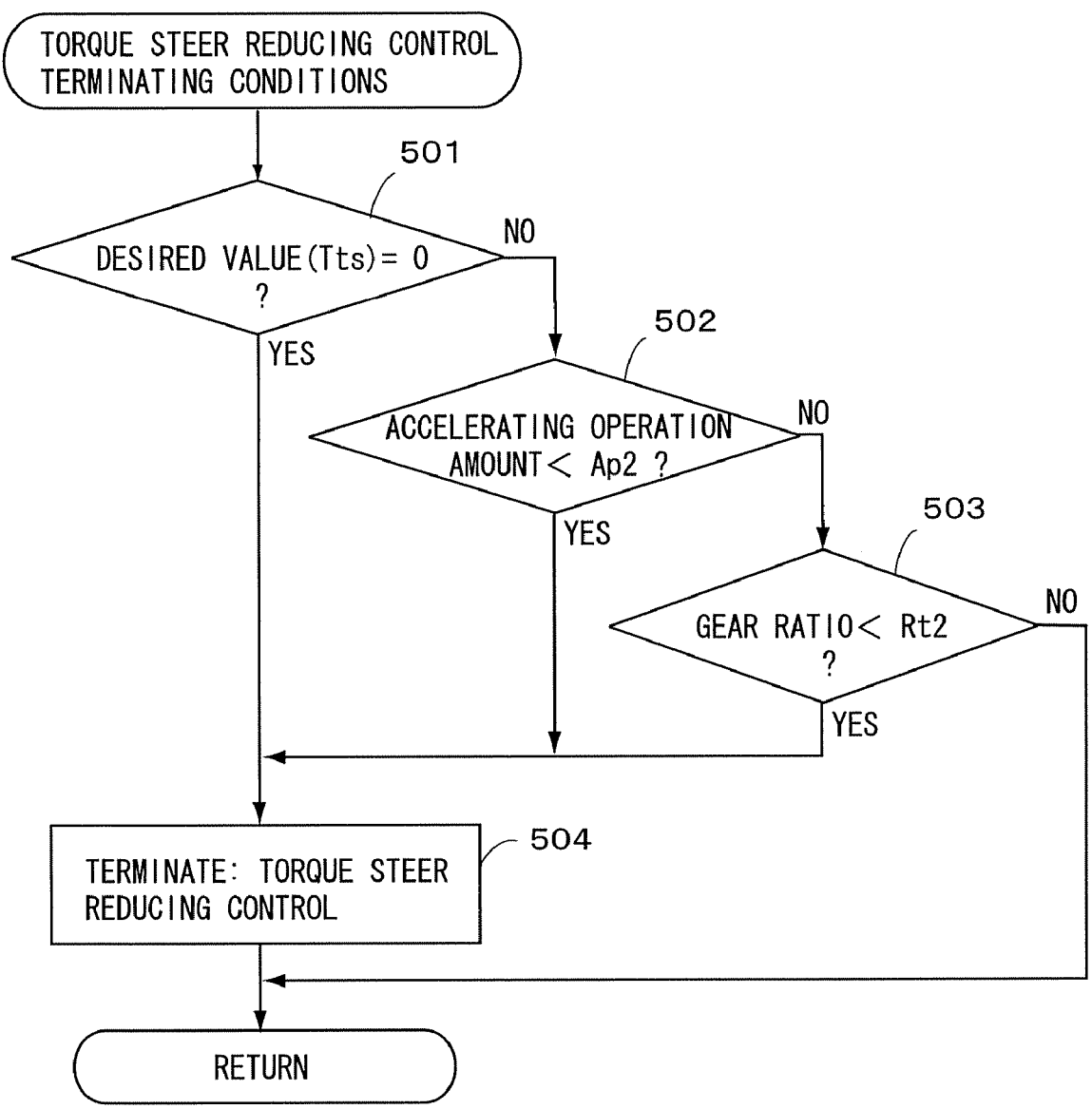
FIG. 16 is a flowchart of an example of torque steer reducing control terminating conditions according to an embodiment of the present invention.
Figure 17:
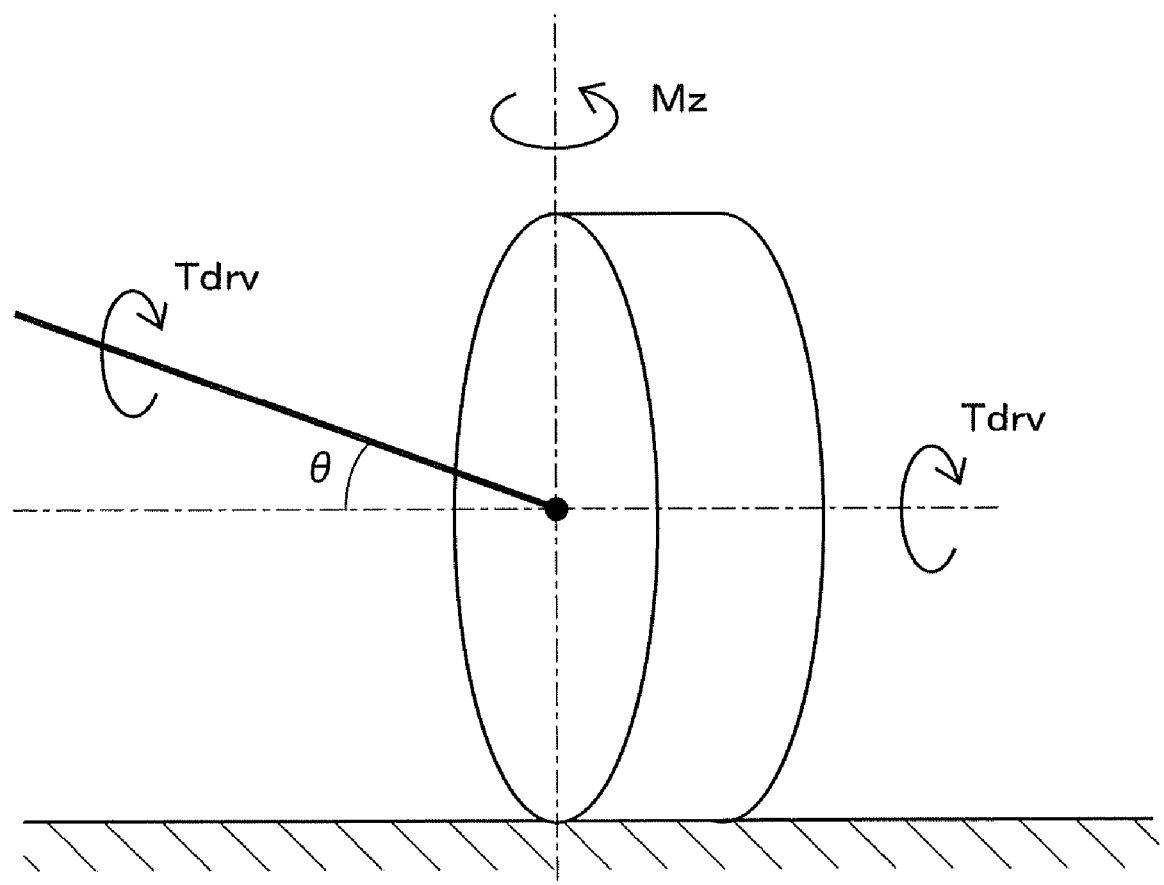
FIG. 17 is a perspective view showing a relationship between a drive shaft and a driving wheel, according to a conventional vehicle.
Figure 18:
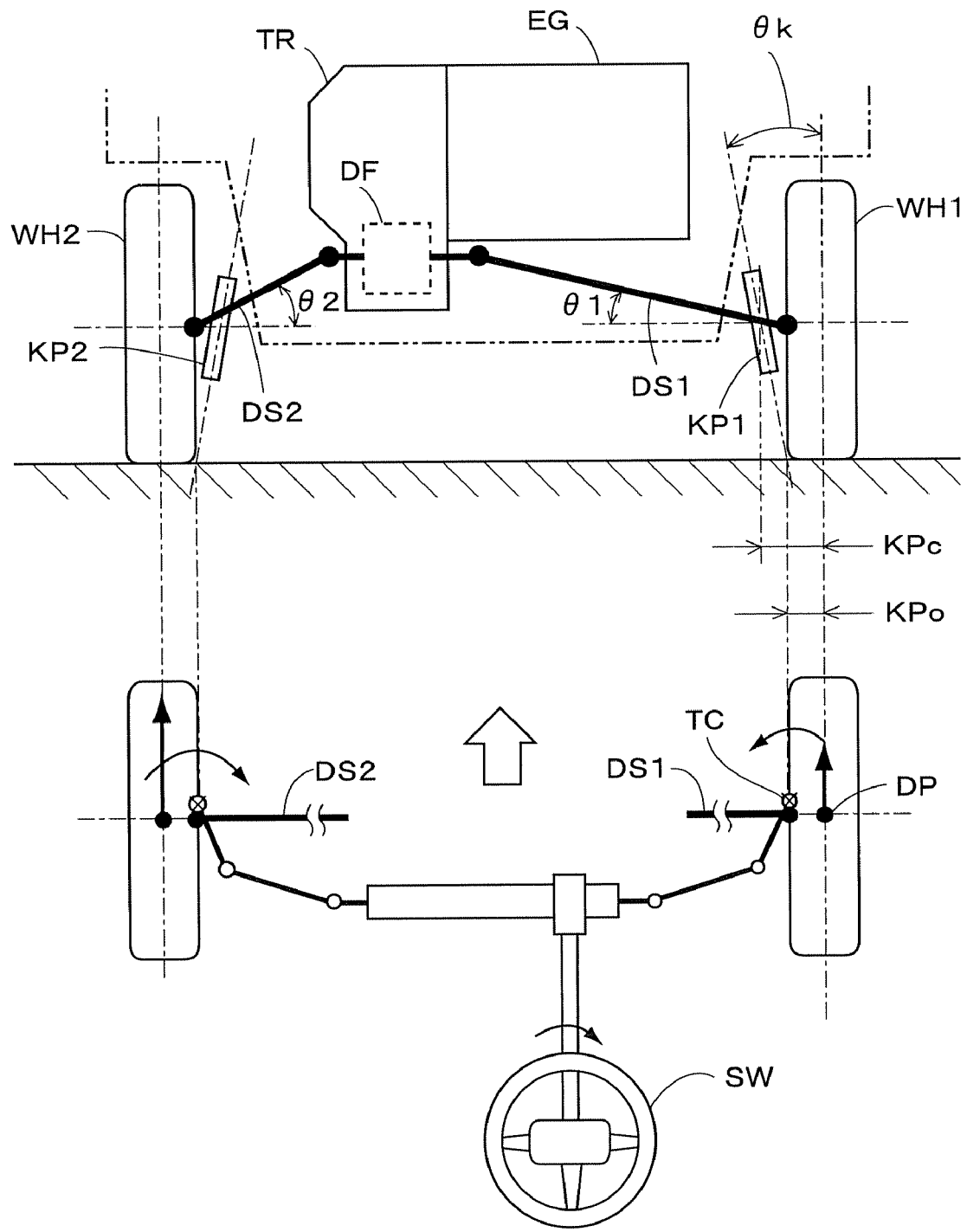
FIG. 18 is a front and plan view of a part including a steering apparatus, according to a vehicle with steered wheels thereof being served as its driving wheels.

Next, the conditions for terminating the torque steer reducing control used at Step 203 in FIG. 4 are determined according to the flowchart as shown in FIG. 16. At the outset, it is determined at Step 501 whether the desired value (Tts) of the torque steer reducing torque is zero, or not. In the case where the desired value (Tts) of the torque steer reducing torque has become zero in its pulse wave form given at the time of starting the control, even if the accelerating operation amount (Ap) was equal to or greater than the predetermined amount (Ap1), the program proceeds to Step 504, where the torque steer reducing control is terminated. In the case where the pulse wave form of the desired value (Tts) of the torque steer reducing torque has not become zero, if it is determined at Step 502 that the accelerating operation amount (Ap) has become smaller than a predetermined amount (Ap2), so that the accelerating state of the vehicle has been reduced, or if it is determined at Step 503 that the transmission TR has been shifted up, so that the speed reducing gear ratio (Rt) has become smaller than a predetermined ratio (Rt2), the program proceeds to Step 504, where the torque steer reducing control is terminated. In the case where those terminating conditions have been fulfilled, the desired value (Tts) of the torque steer reducing torque does not have to be reduced rapidly. Instead, a threshold value may be provided for setting its decreasing gradient to be reduced gradually, whereby rapid change of steering torque to the steering wheel SW can be avoided.

According to the embodiments as described above, the accelerating operation of the vehicle driver is detected by the amount of operation of the accelerator pedal AP, while the accelerating operation can be detected at any part between the accelerating operation of the vehicle driver and the input to the power source for generating the driving force. Therefore, the accelerating operation is not limited to the operation of the accelerator pedal. For example, the accelerating operation of the vehicle driver can be detected by the throttle opening, injected amount of fuel, driving current or voltage for the electric motor, or the like.

The characteristics of the drive shafts DS1 and DS2 can be detected in advance. Therefore, if the accelerating operation of the vehicle driver is equal to or greater than the predetermined value, the steering torque for reducing the transient torque steer resulted from the difference between the characteristics of the drive shafts may be applied to the steering wheel. As a result, when the vehicle is accelerated, the different steering feeling of the vehicle driver can be reduced. Since the torque steer reducing torque applied to the steering wheel is determined in the wave form to be fixed, or variable in accordance with the accelerating operation, it is not required to estimate the driving force applied to the wheels. Furthermore, since the gear ratio of the transmission is considered when the torque steer reducing control is performed, the torque steer reducing torque will not be applied when it is not required, whereby the different feeling will not be given to the vehicle driver.

With the transient torque steer being reduced as described above, the torque steer for steering the steering wheel, which is created by means of the steered wheels when the vehicle is accelerated, can be reduced effectively. Or, since the transient torque steer is created mainly when the vehicle has started to be accelerated, the transient torque steer resulted from the characteristics of the drive shafts can be reduced effectively by performing the torque steer reducing control, when the vehicle has started to be accelerated, i.e., when the vehicle speed is approximately zero, and the accelerating operation is equal to or greater than the predetermined value.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A steering control apparatus for a vehicle having a steering wheel for steering steered wheels of said vehicle, a power source for generating power, and drive shafts for transferring the power to said steered wheels that serve as driving wheels of said vehicle, comprising:

accelerating operation detection means for detecting an accelerating operation amount indicating an amount of vehicle acceleration desired by a vehicle driver; and steering torque control means for controlling steering torque created by said steering wheel, and applying torque steer reducing torque to said steering wheel to reduce torque steer, which is transiently created on said steering wheel due to characteristics of said drive shafts, the torque steer reducing torque being applied when the accelerating operation amount detected by said accelerating operation detection means becomes equal to or greater than a predetermined value, wherein said steering torque control means outputs the torque steer reducing torque in a pulse wave form.

2. A steering control apparatus as set forth in claim 1, further comprising accelerating operation speed detection means for calculating a variation of the accelerating operation amount over time to determine accelerating operation speed, wherein said steering torque control means determines a shape of the pulse wave form on the basis of at least one of the accelerating operation amount detected by said accelerating operation detection means and the accelerating operation speed detected by said accelerating operation speed detection means.

3. A steering control apparatus as set forth in claim 1, wherein said vehicle comprises a transmission disposed between said power source and said drive shafts, and wherein said steering torque control means prohibits applying the torque steer reducing torque to said steering wheel, when a speed reducing gear ratio of said transmission is smaller than a predetermined ratio.

4. A steering control apparatus as set forth in claim 1, further comprising vehicle speed detection means for detecting a vehicle speed of said vehicle, wherein said steering torque control means prohibits applying the torque steer reducing torque to said steering wheel, when the vehicle speed detected by said vehicle speed detection means is greater than a predetermined speed.

5. A steering control apparatus as set forth in claim 1, wherein the torque steer reducing torque is determined in advance, and said steering torque control means applies the torque steer reducing torque to said steering wheel in one direction based on the characteristics of said drive shafts and whether a turning operation of the steering wheel is a right turning operation or a left turning operation.

6. A steering control apparatus as set forth in claim 1, wherein the accelerating operation amount is at least one of an amount of movement of an accelerator pedal, an amount of throttle opening, an amount of fuel injection, and a driving current or voltage.

7. A steering control apparatus for a vehicle having a steering wheel for steering steered wheels of said vehicle, a power source for generating power, and drive shafts for transferring the power to said steered wheels that serve as driving wheels of said vehicle, comprising:

accelerating operation detection means for detecting an accelerating operation amount indicating an amount of vehicle acceleration desired by a vehicle driver;

vehicle speed detection means for detecting a vehicle speed of said vehicle; and steering torque control means for controlling steering torque created by said steering wheel, and applying torque steer reducing torque to said steering wheel to reduce torque steer, which is transiently created on said steering wheel due to characteristics of said drive shafts, the torque steer reducing torque being applied when the vehicle speed detected by the vehicle speed detection means is approximately zero and when the accelerating operation amount detected by said accelerating operation detection means becomes equal to or greater than a predetermined value, in a situation in which said vehicle has started moving, wherein said steering torque control means outputs the torque steer reducing torque in a pulse wave form.

8. A steering control apparatus as set forth in claim 7, wherein the accelerating operation amount is at least one of an amount of movement of an accelerator pedal, an amount of throttle opening, an amount of fuel injection, and a driving current or voltage.

* * * * *